US010486094B2

(12) United States Patent
Katare et al.

(10) Patent No.: US 10,486,094 B2
(45) Date of Patent: Nov. 26, 2019

(54) COLLAPSABLE V-BANK FILTER

(71) Applicant: 3M INNOVATIVE PROPERTIES COMPANY, St. Paul, MN (US)

(72) Inventors: Rajesh K. Katare, Cottage Grove, MN (US); Chris T. Gasman, New Richmond, WI (US); Kenneth J. Snider, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 66 days.

(21) Appl. No.: 15/560,801

(22) PCT Filed: May 3, 2016

(86) PCT No.: PCT/US2016/030551
§ 371 (c)(1),
(2) Date: Sep. 22, 2017

(87) PCT Pub. No.: WO2016/186828
PCT Pub. Date: Nov. 24, 2016

(65) Prior Publication Data
US 2018/0111075 A1  Apr. 26, 2018

Related U.S. Application Data

(60) Provisional application No. 62/162,042, filed on May 15, 2015.

(51) Int. Cl.
*B01D 46/00* (2006.01)
*B01D 46/12* (2006.01)
*B01D 46/52* (2006.01)

(52) U.S. Cl.
CPC ....... *B01D 46/0016* (2013.01); *B01D 46/125* (2013.01); *B01D 46/521* (2013.01); *B01D 2265/04* (2013.01)

(58) Field of Classification Search
CPC .... B01D 46/00; B01D 46/125; B01D 46/521; B01D 2265/04; B01D 46/0016
(Continued)

(56) References Cited

U.S. PATENT DOCUMENTS 5,679,122 A * 10/1997 Moll .................. B01D 46/0005
210/493.3
7,931,726 B2   4/2011 Karlsson
(Continued)

FOREIGN PATENT DOCUMENTS

CN          101385933          3/2009

OTHER PUBLICATIONS

International Search Report for PCT/US2016/030551 (dated Aug. 12, 2016) 3 pages.

*Primary Examiner* — T. Bennett McKenzie
(74) *Attorney, Agent, or Firm* — Scott A. Baum

(57) ABSTRACT

A V-bank filter having a plurality of filter panels having a first side end opposed to a second side end, the plurality of filter panels arranged into one or more V-configurations, and a first flexible side panel joined to the first side ends and a second flexible side panel joined to the second side ends. The V-bank filter having an operating position having a distance, O, between individual filter panels measured at an open end of the one or more V-configurations when in the operating position and a collapsed position having a distance, C, between individual filter panels measured at the open end when in the collapsed position. The distance C is less than the distance O when the V-bank filter is placed into the collapsed position and the plurality of filters panels can be moved between the collapsed position and the operating position while maintaining a substantially air tight connection between the plurality of filter panels and the first flexible side panel and while maintaining a substantially air tight (Continued)

connection between the plurality of filter panels and the second flexible side panel.

22 Claims, 6 Drawing Sheets

(58) Field of Classification Search
USPC .................................. 55/378, 521, 482–519
See application file for complete search history.

(56) References Cited

U.S. PATENT DOCUMENTS

| | | |
|---|---|---|
| 8,425,644 B2 | 4/2013 | Sundvik |
| 8,491,689 B2 | 7/2013 | Duffy |
| 2004/0182055 A1 | 9/2004 | Wynn |
| 2005/0144916 A1 | 7/2005 | Adamek |
| 2006/0138038 A1* | 6/2006 | Proulx .................. B01D 29/111 210/321.86 |
| 2007/0204576 A1 | 9/2007 | Terlson |
| 2008/0148698 A1* | 6/2008 | Nowak .............. B01D 46/0016 55/493 |
| 2008/0204252 A1* | 8/2008 | Tolley .................... A01M 1/026 340/573.2 |
| 2009/0142234 A1* | 6/2009 | Tatarchuk ............ B01D 46/002 422/122 |
| 2010/0269463 A1* | 10/2010 | Duffy .................. B01D 46/125 55/483 |
| 2012/0260803 A1* | 10/2012 | Wiser ................ B01D 46/0032 96/54 |
| 2012/0311978 A1 | 12/2012 | Crabtree |
| 2013/0081996 A1 | 4/2013 | Kamp |
| 2013/0167493 A1 | 7/2013 | Gorman |
| 2013/0205732 A1 | 8/2013 | Gillilan |
| 2014/0137524 A1 | 5/2014 | Jarrier |

* cited by examiner

COLLAPSABLE V-BANK FILTER

CROSS REFERENCE TO RELATED APPLICATIONS

This application is a national stage filing under 35 U.S.C. 371 of PCT/US2016/030551, filed May 3, 2016, which claims the benefit of U.S. Provisional Patent Application No. 62/162,042, filed May 15, 2015, the disclosures of which are incorporated by reference in their entirety herein.

BACKGROUND

V-bank filters having one or more pleated panels oriented in a V-configuration are known. Typically, the pleated panels are disposed into a rigid frame made of metal or plastic that maintains the pleated panels in a fixed configuration. The V-bank filters are shipped from the factory with the pleated panels arranged into the fixed V-configuration.

SUMMARY

V-bank filters are bulky with a large amount of space present between the pleated panels in the V-bank filter. Shipping costs can be quite large and uneconomical; especially, if the V-bank filters are made in one country and then shipped into another country. Therefore, what is needed is a collapsible V-bank filter such that the V-bank filters can be shipped in the collapsed position to minimize shipping expenses and then expanded into the operating position for installation into an HVAC system. While it is possible to ship individual panels and rigid framing for assembly into a V-bank filter, typically forming an airtight connection between the individual filter panels is difficult, cumbersome, time consuming, or expensive. Therefore, a collapsible V-bank filter having the pleated filter panels already joined to each other is needed.

One method of achieving such a filter is to use flexible side panels that in one embodiment comprise a thermoplastic material such that they can be thermoplastically welded or ultrasonically bonded to the pleated filter panels. In a similar manner, the individual filter panels can be joined to each other by a flexible thermoplastic end cap that can be welded or ultrasonically bonded to the filter panels.

As such, the resulting V-bank filters can be changed from the operating position where the filter panels are arranged into one or more V-configurations, compressed into a collapsed position where the filter panels are substantially parallel to each other for shipping, and then expanded back into the operating position.

Hence, in one embodiment, the invention resides in a V-bank filter including a plurality of filter panels having a first side end opposed to a second side end, the plurality of filter panels arranged into one or more V-shaped configurations, a first flexible side panel joined to the first side ends and a second flexible side panel joined to the second side ends, and wherein the plurality of filter panels in the one or more V-shaped configurations comprises an operating position; a collapsed position wherein a distance, C, between individual filter panels at an open end in the collapsed position is less than a distance, O, between individual filter panels at the open end in the operating position; and wherein the plurality of filters panels can be moved between the collapsed position and the operating position while maintaining a substantially air tight connection between the plurality of filter panels and the first flexible side panel and while maintaining a substantially air tight connection between the plurality of filter panels and the second flexible side panel.

In another embodiment the invention resides in a V-bank filter including a plurality of filter panels having a first side end opposed to a second side end, the plurality of filter panels arranged into one or more V-shaped configurations, a first side panel joined to the first side ends, and a second side panel joined to the second side ends by a thermoplastic weld.

In another embodiment the invention resides in a method of making the V-bank filter including placing the plurality of filter panels in a fixture to hold them in the one or more V-shaped configurations; placing the first side panel into the fixture adjacent the first side edges of the plurality of filter panels, and placing the second side panel into the fixture adjacent the second side edges; clamping the first side panel and the second side panel between opposing heated platens; heating the first side panel and the second side panel to join them to the first and second side edges of the plurality of filter elements; removing the opposing heated platens; and removing the V-bank filter from the fixture.

DETAILED DESCRIPTION

Figure 1:
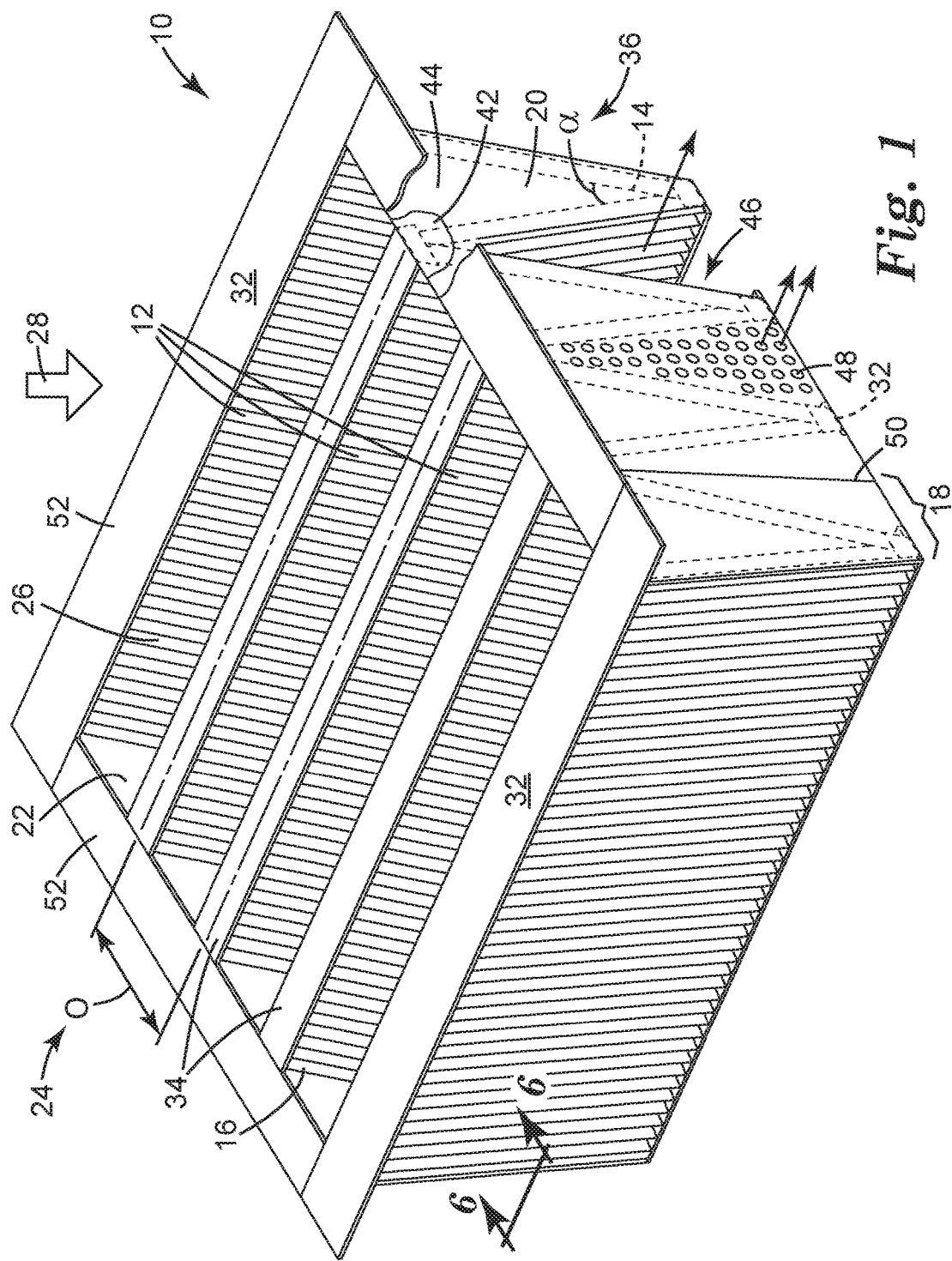
FIG. 1 illustrates a V-bank filter in an operating position enabling airflow to move through the V-bank filter

Referring now to FIG. 1, a V-bank filter 10 includes a plurality of filter panels 12 having a first side end 14 opposed to a second side end 16 with the plurality of filter panels arranged into one or more V-configurations 18. A first flexible side panel 20 is joined to the first side ends 14 and a second flexible side panel 22 is joined to the second side ends 16. The V-bank filter of FIG. 1 is shown in an operating position 24 having a distance, O, between the center lines of individual filter panels 12 measured at an open end 26 of the one or more V-configurations 18 when in the operating position. An arrow illustrates 28 the airflow through the V-bank filter when in the operating position.

Figure 2:
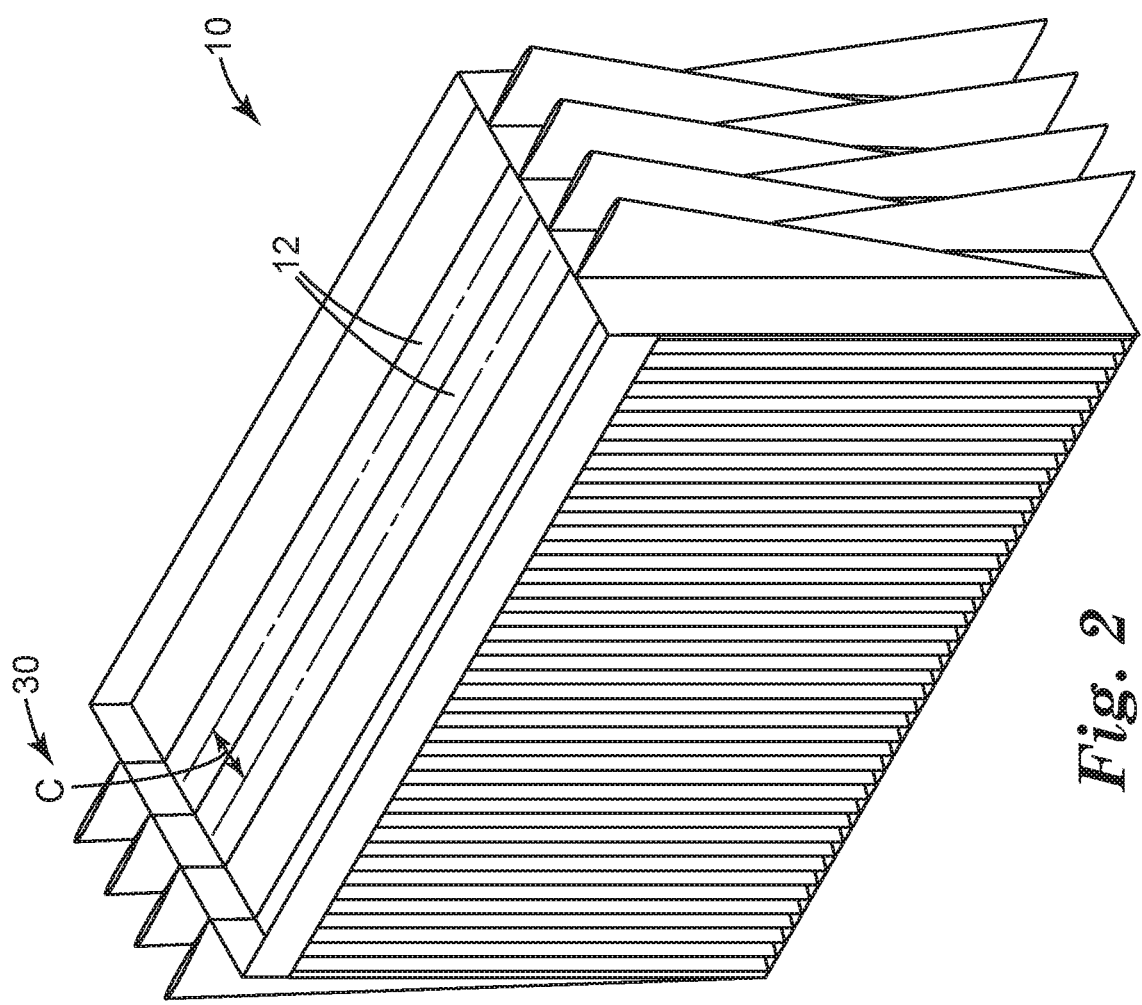
FIG. 2 illustrates the V-bank filter of FIG. 1 in a collapsed position

Referring now to FIG. 2, the V-bank filter has a collapsed position 30 having a distance, C, between center lines of the individual filter panels 12 measured at the open end when in the collapsed position. As seen the distance C is less than the distance O when the V-bank filter is placed into the collapsed position. Referring now back to FIG. 1, the plurality of filters panels can be moved between the collapsed position (FIG. 2) and the operating position while maintaining a substantially air tight connection between the plurality of filter panels 12 and the first flexible side panel 20 and while maintaining a substantially air tight connection between the plurality of filter panels 12 and the second flexible side panel 22.

FIG. 2 shows The V-bank filter of FIG. 1 in a fully collapsed position wherein the plurality of filter panels 12 are substantially parallel to each other in the collapsed positon and there is no longer an open end 26 present between adjacent filter panels. However, there no requirement to fully collapse the structure and the distance C, in the collapsed position, can be less than or equal to 75% of O, 50% of O, or 25% of O.

In one embodiment, the dimensions of a standard trapezoidal V-bank filter were 22.25 in. length by 22.25 in. width at the top open end by 12 in. height by 17.25 in. length at lower downstream end when in the operating position (FIG. 1). This filter had a distance O of approximately 5.25 in. and a calculated volume of 5273 cubic inches. (V=½*h* (l+b)*w where h=12 in., l=22.25 in., b=17.25 in. and w=22.25 in.) A single V-bank filter of this size is typically shipped in a 24 in.×24 in.×12 in. carton having a volume of 6912 cubic inches.

The same sized V-bank filter in the fully collapsed position (FIG. 2, C approximately 1.5 in.; FIG. 1, O approximately 5.25 in.), reduces to the size of a trapezoidal shape of 22.25 in. width by 7.5 in. length at top open end by 12 in. height by 6 in. length at lower downstream end. The collapsed filter is slightly trapezoidal since the pleated filer panels are partially nested at the joints which varies the distance C for the interior filter panel spacing from 1.5 in. for the six central panels to 1.25 in. for the outer two panels that are not nested with another panel at the filter's top. This shape will have total volume of 1883 cubic inches (V=½*12*(7.5+6)*23.25) and three of these filters can be shipped in the standard 24 in.×24 in.×12 in. carton with enough spare room included for the frame parts to complete the on-site assembly. Thus, for nominally the same shipping cost, three times as many collapsible V-bank filters can be shipped as opposed to using non-collapsible V-bank filters of the same size. Additionally, there is a significant saving in the corresponding packaging materials for cartons and sealing tape.

Figure 3:
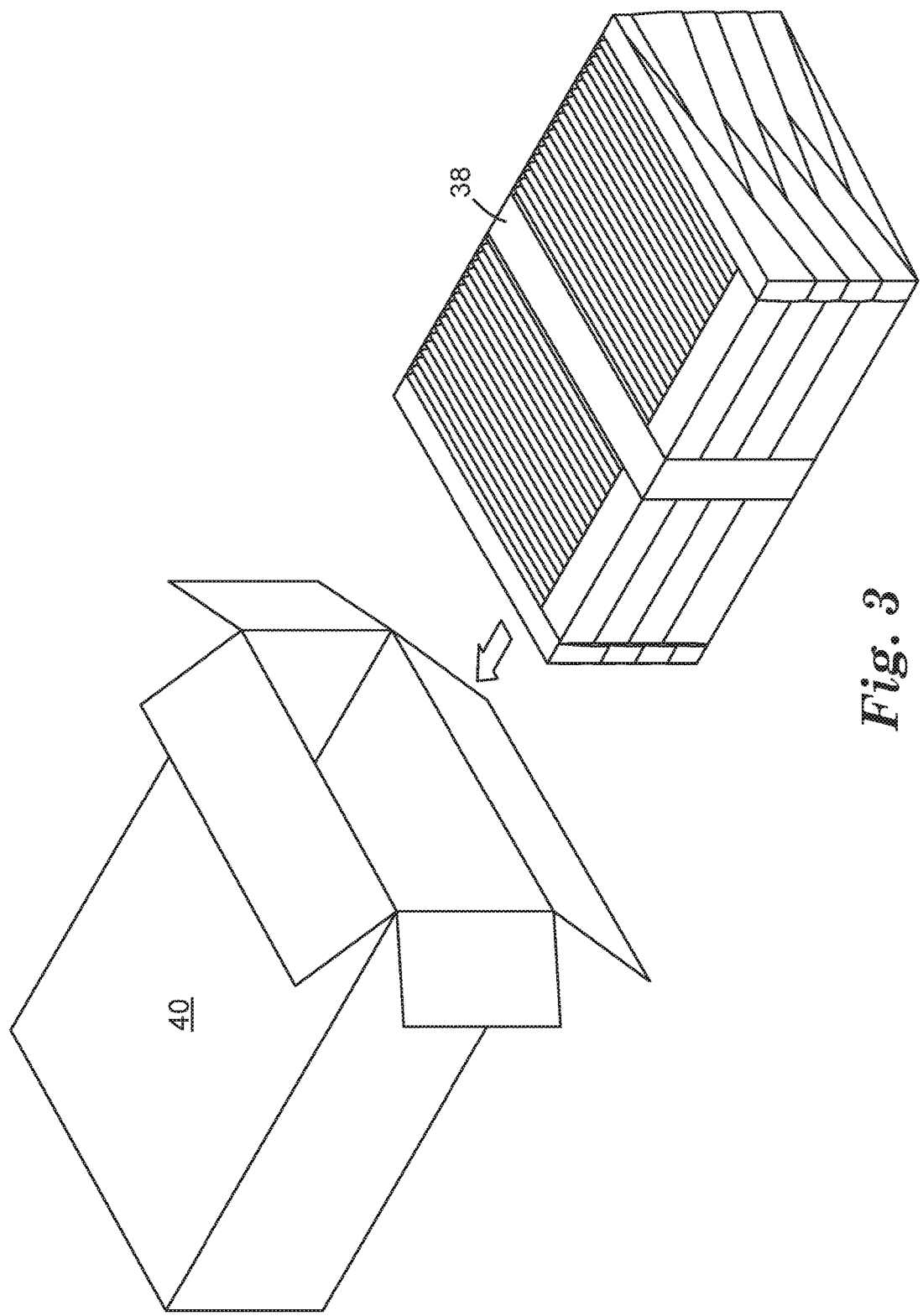
FIG. 3 illustrates the V-bank filter of FIG. 2 being placed into a carton

Referring now to FIG. 3, a restraining member 38 can be used to hold the V-bank filter in the collapsed position. In at least some embodiments, depending on the material used for the flexible side panels (20, 22), the V-bank filter 10 will not stay in the collapsed position shown in FIG. 2 and the V-bank filter at least partially springs open into the operating position shown in FIG. 1 and may fully open into the operating position after removing the force used to collapse the structure. The restraining member can be a band surrounding and securing the V-bank filter in the collapsed position. Alternatively, the restraining member can be a box or carton 40, with or without the band securing the V-bank filter in the collapsed position. Other suitable restraining members include tape, bags, shrink wrap, clips, and other general packaging supplies.

The filter panels may be pleated as shown or instead may be left un-pleated. Suitable materials for making the filter panels are known to those of skill in the art depending on the specific application and the expected type and level of containments. The filter panels may be single ply or multi-ply construction and utilize a stiffer layer for pleating and another layer for filtering. Suitable filter materials include nonwoven webs of thermoplastics (polypropylene, nylon, polyester, acrylics, etc.), paper, glass/carbon fibers, metal wool and/or ceramic fibers. The filter panels could also contain additional filtration and process aids such as activated carbons, electric charges, anti-oxidants, or catalysts.

In one embodiment, as best seen in FIG. 1, the adjacent filter panels 12 at an apex 32 of the one or more V-configurations 18 can be joined to each other by flexible endcaps 34. The flexible end caps allow for an included angle α, 36, to change as the V-bank filter is moved from the operating position to the collapsed position. Included angle α is measured between the inlet face of one filter to the inlet face of an immediately adjacent filter. The included angle α in the operating position is determined by size, shape, air and pressure drop modeling and is typically in the range from 15 degrees to 45 degrees. The included angle α in the collapsed position is less than the included angle α in the operating position and can be from 40 degrees to 0 degrees, or from 20 degrees to 0 degrees, or from 5 degrees to 0 degrees.

The flexible endcaps span the distance from one filter panel to the next adjacent filter panel to secure them to each other and to form an airtight connection between them. The flexible endcaps can be flush with the faces of the filter panels as seen in FIG. 1 or they can be wrapped over the edges of the filter panels to cover at least a portion of each filter's face. The flexible endcaps can be flush with the first and second side ends (14, 16) or they can be wrapped over the edges to cover at least a portion of the first side edge 14 and at least a portion of the second side edge 16 as seen in FIG. 1.

Instead of flexible endcaps, the plurality of filter panels can be joined to each other by filling the apex 32 of each V-configuration 18 with an elastomeric material to secure the filter panels to each other, to form an airtight connection between the filter panels, and to allow the included angle α between the filter panels to decrease as the structure is at least partially collapsed. Suitable elastomeric materials include thermoplastics such as polypropylene, polyester, acrylics, and other flexible plastic substances with adhesive properties.

In one embodiment for the V-bank filter 10, the first flexible side panel 20, the second flexible side panel 22, or the flexible endcaps 34 were made from a thermoplastic material thermoplastically welded to the plurality of filter panels. The thermoplastic material may include, polyethylene film, polypropylene, polyester, polyvinylchloride, chlorinated polyvinylchloride, polyvinylidenefluoride, or acetyl. In one embodiment, the thermoplastic material was between 5 to 30 mils thick. In one specific embodiment, the polyethylene film was between 5 to 30 mils thick.

Figure 6:
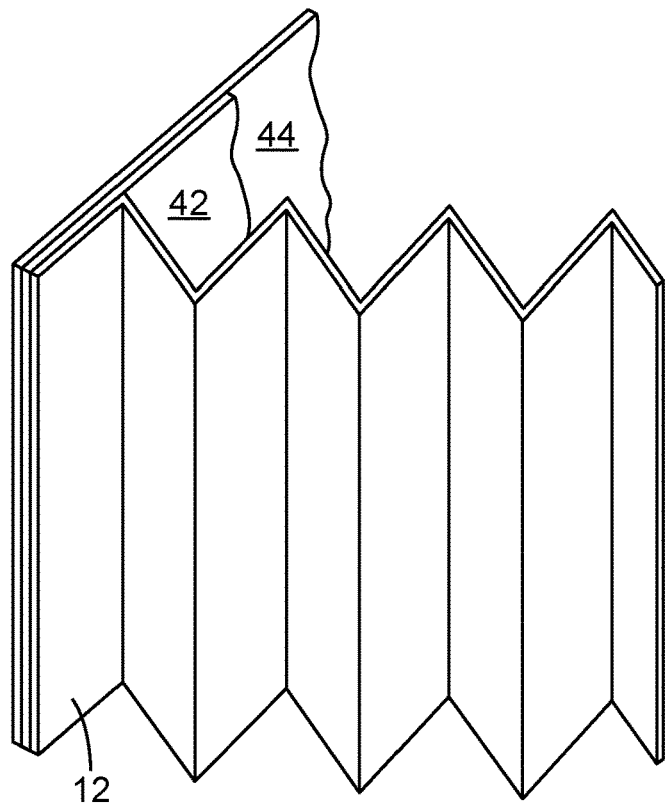
FIG. 6 illustrates a partial cross section of the V-bank filter of FIG. 1 taken at 6-6

Referring now to FIG. 6, in one embodiment for the V-bank filter 10 the first flexible side panel 20, the second flexible side panel 22, or the flexible endcaps 34 were made from an inner layer 42 of a thermoplastic material thermoplastically welded to the plurality of filter panels 12 and an outer layer 44 of a nonwoven material thermoplastically welded to the inner layer 42. The inner layer thermoplastic material may include, polyethylene film, polypropylene, polyester, polyvinylchloride, chlorinated polyvinylchloride, polyvinylidenefluoride, or acetyl. In one embodiment, the thermoplastic material was between 5 to 30 mils thick. In one specific embodiment, the polyethylene film was used between 5 to 30 mils thick. The outer layer nonwoven material may include polyester and other thermoplastics such as nylon, glass/carbon fiber, and fluoropolymers. In one embodiment the outer nonwoven layer was between 3-10 mils thick. In one specific embodiment the outer layer was polyester between 3-10 mils thick.

The bend radius is defined as the minimum inside radius of curvature for a 1 inch strip (2.54 cm) of the flexible side panel or the flexible endcap wrapped around a circular cross section that the strip can be bent to without kinking or damaging the material. In various embodiments of the invention, the bend radius for the first flexible side panel 20, the second flexible side panel 22, or the flexible endcaps 34 can be less than or equal to 2.0 inches, less than or equal to 1.0 inches, or less than or equal to 0.5 inches and greater than 0.01 inches.

Referring to FIG. 1, the flexible side panels (20, 22) can include optional structural weakening elements to make the V-bank filter easier to collapse. The structural weakening elements can include slits or cutouts 46, apertures or perforations 48, score lines or fold lines 50, or pleats, or combinations thereof. Some of the structural weakening elements (slits, cutouts, perforations, and apertures) allow for airflow to pass through the flexible side panels and can reduce the total pressure drop of the V-bank filter in operation. These features need to be located in portions of the flexible side panels after the incoming airflow has passed through one of the filter panels as shown.

In some embodiments, as seen in FIG. 1, the first flexible side panel 20 and the second flexible side panel 22 extend past an upper surface of the plurality of filter panels forming a flange 52. Alternatively or in combination with extending the side panels, the first endcap applied to the first outer filter panel and the second endcap applied to the second outer filter panel can extend from each filter panel forming the flange 52. In some embodiments, a flange 52 will surround the open end 26 on all four sides as shown in FIG. 1. In some embodiments where the flexible side panels and the flexible endcaps are made from an inner layer of a thermoplastic material and an outer layer of a nonwoven material, only the outer nonwoven layer is extended to form the flange. Depending on the construction of the housing or frame the V-bank filter is disposed into, the thickness and flexibility of the flange can be selected to be compatible with the housing or frame to secure the V-bank filter during operation.

Figure 4:
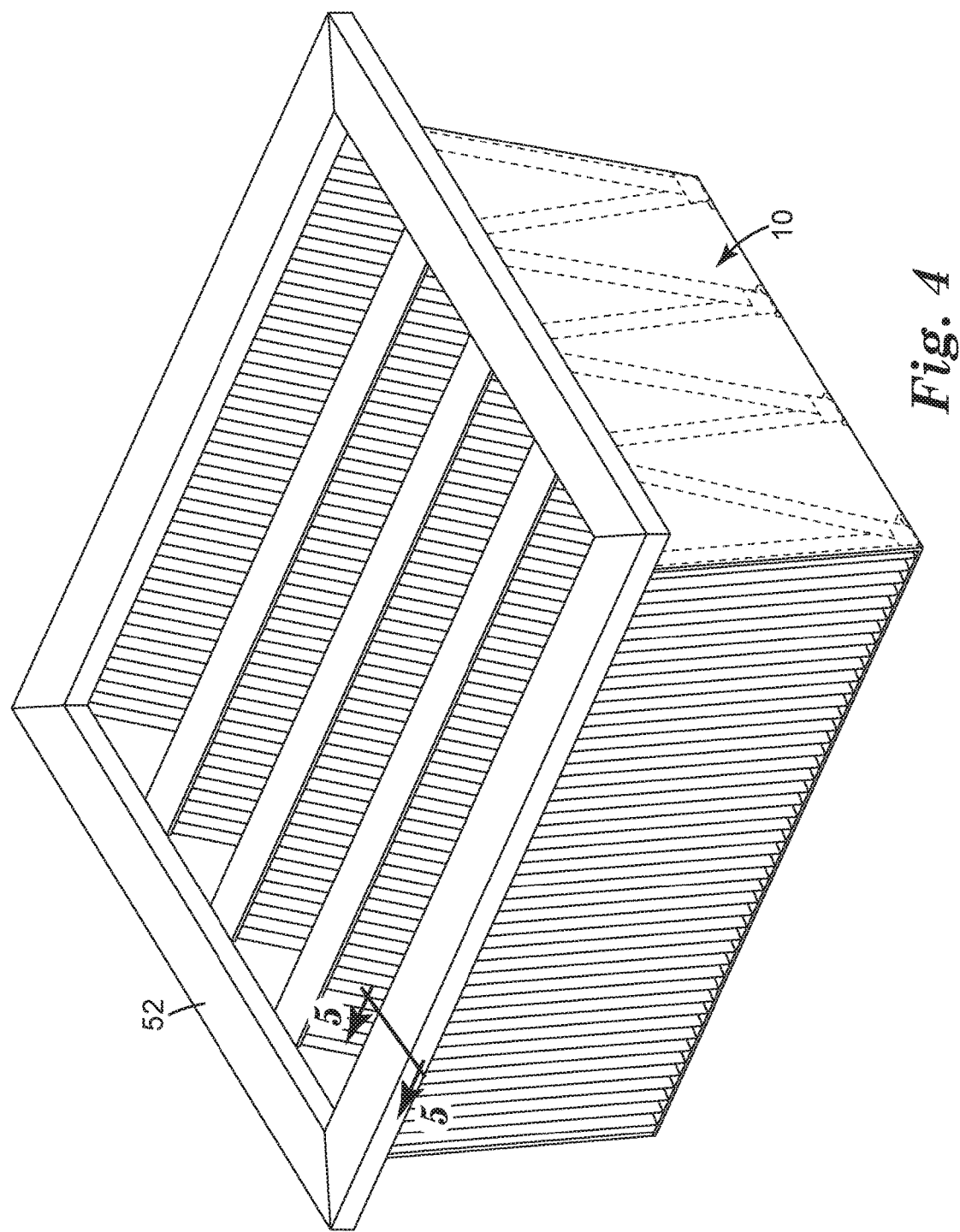
FIG. 4 illustrates a frame for holding the V-bank filter of FIG. 1
Figure 5:
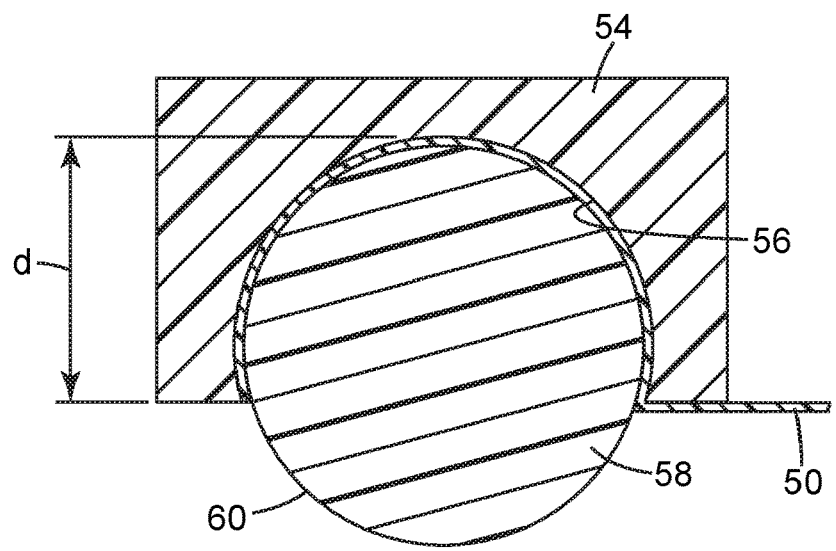
FIG. 5 illustrates a cross section of the frame of FIG. 4 taken at 5-5

Referring now to FIG. 4, the V-bank filter of FIG. 1 is disposed into a frame 52. Referring to the cross section taken at 5-5 of FIG. 4 and illustrated in FIG. 5, the frame 52 can have a generally rectangular cross section 54 with a groove 56. The groove 56 can have a generally circular cross section that extends for more than ½ the diameter of the circle to squeeze, pinch, and/or capture an elastomeric member 58 within the groove 56 that holds the flange 50 within the grove thereby retaining the V-bank filter to the frame.

The elastomeric member 58 can have a circular cross section prior to being placed into the groove that is larger than the circular cross section of the groove. As such, the elastomeric member 58 can extend further than a depth of the groove, d, thereby forming a sealing surface 60 extending from the frame for sealing the V-bank filter to an air intake housing. As such, the elastomeric member provides two functions: retaining the V-bank filter to the frame 52 by capturing the flange 50 in the groove 56 and providing a gasket to seal the V-bank filter in use to the housing of the HVAC system.

Depending of the relative sizes of the circular cross sections of the groove 56 and the elastomeric member 58 prior to installation in the groove, the elastomeric member can have a circular cross section prior to installation in the groove 56 and an hourglass cross section (not shown) after installation in the groove where it is pinched by the groove 56 as it exists the groove to form the sealing surface 60. The greater the relative difference in size between the diameter of the groove and the larger diameter of the elastomeric member, the more squished and hourglass in shape the elastomeric member becomes after installation in the groove.

Suitable materials for the frame 52 include polystyrene, polypropylene, polyvinylchloride, acetyl, acrylonitrile butadiene styrene, polycarbonate, polyethylene terephthalate, glycol-modified, and fiberglass. Suitable materials for the elastomeric member 58 include polystyrene, nitrile rubber, fluoroelastomers, fluorinated ethylene propylene, ethylene propylene diene monomer, silicon, and polyurethane foam.

Figure 7:
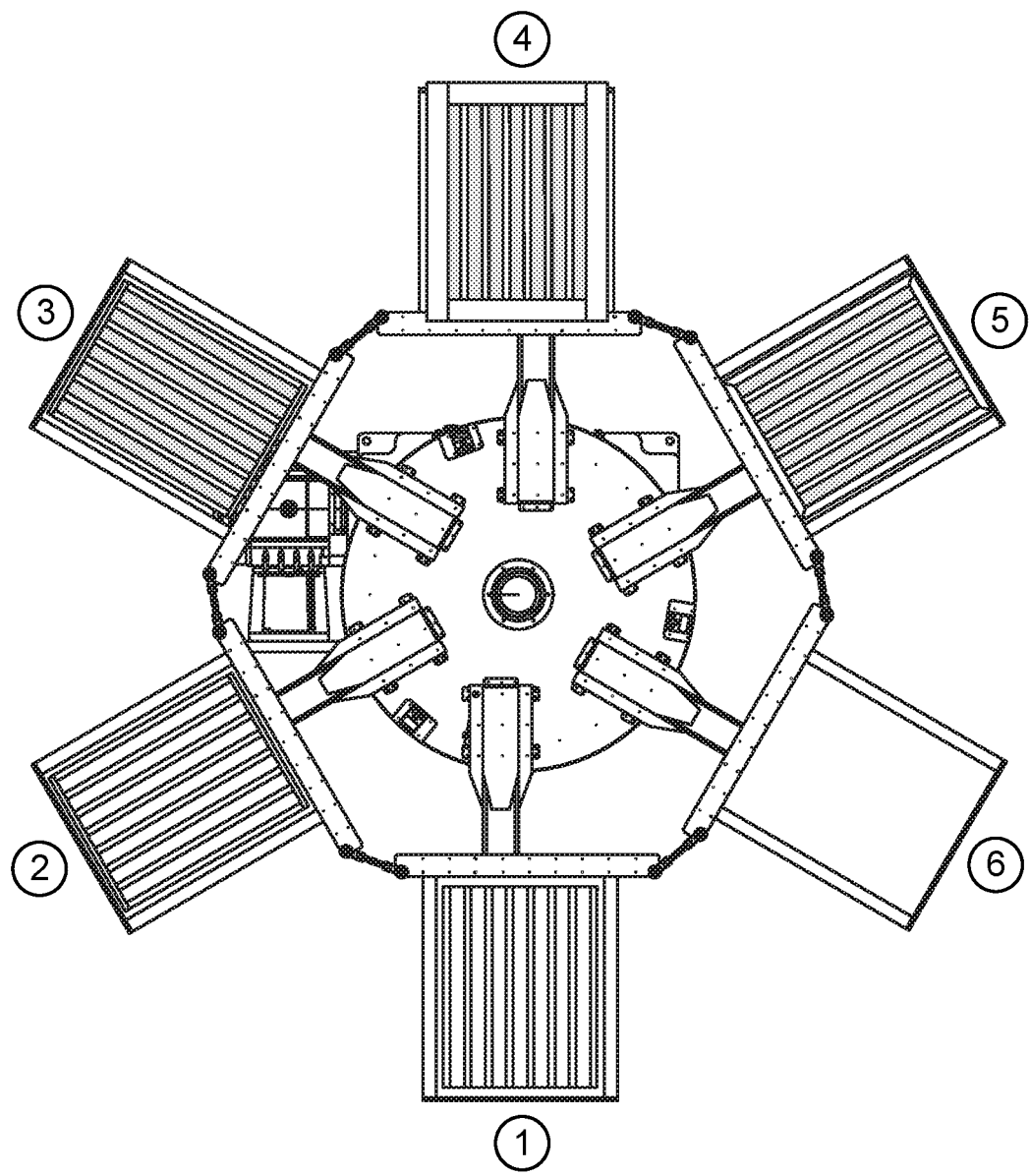
FIG. 7 illustrates a method for making a V-bank Filter

Referring now to FIG. 7 a method of making a V-bank filter is illustrated. At station 1 the plurality of filter panels are placed in a fixture to hold them in the one or more V-shaped configurations. Station 2 illustrates placing the first side panel into the fixture adjacent the first side edges of the plurality of filter panels, and placing the second side panel into the fixture adjacent the second side edges. Station 2 then clamps the first side panel and the second side panel between opposing heated platens. Station 2 then heats the first side panel and the second side panel to join them to the first and second side edges of the plurality of filter elements. Optionally the process can continue at Station 3 by placing the flexible endcaps over the apexes of the V-configurations of the plurality of filter panels and like station 2 than clamping and heating the flexible end caps between opposing heated platens to join the endcaps to the filter panels. At Station 4 the flange created by the extended side panels and two of the endcaps can be disposed into the frame's groove. Optionally, the V-bank filter can be removed at Station 4 and restrained in the collapsed position transport and not disposed into the frame. At Station 5, the elastomeric member can be positioned over the groove and pushed into the groove to retain the V-bank filter in the frame and at Station 6, the completed V-bank filter assembly can be removed from the machine.

EXAMPLES

In one embodiment, a 40 gram per square meter (gsm) polypropylene blown melt fiber media manufactured at 3M Company's Aberdeen, SD, plant was laminated, using a hot glue spray laminator to a spun bond polyester scrim (90 gsm, Johns Manville, Denver, Colo.). This two layer media was electret charged to improve filtration efficiency.

The charged laminated media was pleated in an industrial rotary pleater to create 1 inch (2.54 cm) pleat widths. The rotary pleater scored the media at 1 inch (2.54 cm) intervals while feeding it forward and then pleated the web at the scored creases. The pleated web entered a heated zone followed by a spacing mechanism that separated the pleats to a 5.75 mm width interval between adjacent pleats. Several hot melt adhesive nozzles dropped a bead of adhesive that solidified and locked in the pleat separation spacing. The last step in the process was to cut the pleat panels into the desired length of 22 inches (56 cm with 92 pleats) and a height of 11.25 inches (28.58 cm).

Eight of these pleat panels were used in fabricating a 24"×24" (61 cm×61 cm) standard V-bank filter with four V-configurations similar to FIG. 1. An operator picked two pleated panels and interleaved them at one end and inserted them into an assembly fixture which ensured a 22 degree included angle α between the pleated panels. This operation was repeated until all of the eight pleat panels were inserted into the assembly fixture. The next step in the process was to carefully interleave the top ends of the pleated panels and engage the separation mechanism that held the pleated panels in position for further processing.

For this embodiment flexible side panels and flexible endcaps (both front and back) was prepared by laminating a 20 mil (0.51 mm) thick low density polyethylene film to a 10 mil (0.25 mm) thick spunbond polyester nonwoven web using a sprayed adhesive. End caps (1.5 inch or 2.5 inch by 25 inch (38 mm or 64 mm by 640 mm)) and side panels (25"

width open end, 17.25" width lower end, and 15" height (635 mm, 438.2 mm, and 380 mm in trapezoid shape) were cut out of this laminated material using template dies for further assembly.

Five end caps were placed on the front side of the V-bank filter (with polyethylene touching the pleated panels) on the panel ends/joints. Two end caps at either side were wider (2.5 inches (64 mm)) to ensure that enough material was left out for the flange to attaching the V-bank filter to a frame.

An aluminum plate heater (24 inch by 24 inch (610 mm by 610 mm)) was brought down on top of the endcaps to thermoplastically weld them to the filter panel joints. The hot plate was pre-heated to a temperature of 450° F. (232° C.) and a temperature controller maintained this temperature throughout the assembly process. The hot plate was kept in firm contact with the endcaps for 30 seconds and then lifted off the fixture. The fixture assembly was then flipped upside down to weld the remaining four endcaps to the filter panel joints. To apply the side panel, the fixture was rotated so the side of the filter was facing up towards the plate heater. Edges of the end caps were folded down and a trapezoidal side panel was placed carefully to cover the V-bank filter side completely and the hot plate heater was engaged for thermoplastic welding. Thirty seconds of firm contact at 450° F. was used to thermoplastically weld both of the trapezoidal side panels.

The completed V-bank filter was compressed and relaxed several times by hand from the operating position shown in FIG. 1 to the fully collapsed position shown in FIG. 2 where the included angle α was zero degrees and each filter panel was nominally parallel to each other and touching. Upon removal of the compressive force, the V-bank filter would spring open to operating position shown in FIG. 1. All of the thermoplastic welds remained intact and the V-bank filter was suitable for use even after being fully collapsed.

What is claimed is:

1. A V-bank filter comprising:
    a first pair of filter panels comprising a first individual filter panel and a second individual filter panel, each individual filter panel comprises a first side end opposed to a second side end and a third top end opposed to a fourth bottom end, wherein a first flexible side panel is joined to the first side ends extending along the first side ends in a direction from the fourth bottom ends toward the third top ends and a second flexible side panel is joined to the second side ends extending along the second side ends in a direction from the fourth bottom ends toward the third top ends, and wherein a flexible end cap joins the fourth bottom ends,
    wherein during an operating position of the V-bank filter, the third top ends of the first and second individual filter panels are separated by a distance O forming an open end for airflow through the V-bank filter,
    wherein during a collapsed position of the V-bank filter, the third top ends of the first and second individual filter panels are separated by a distance C,
    wherein the distance C is less than the distance O,
    wherein the individual filter panels can be moved between the collapsed position and the operating position while maintaining a substantially air tight connection between the first and second individual filter panels with the first side panel, the second side panel and the flexible end cap.
2. The V-bank filter of claim 1 wherein the first flexible side panel, the second flexible side panel, or the flexible end cap comprises a thermoplastic material thermoplastically welded to the plurality of individual filter panels.
3. The V-bank filter of claim 2 wherein the thermoplastic material comprises polyethylene film.
4. The V-bank filter of claim 3 wherein the polyethylene film is between 5 to 30 mils thick.
5. The V-bank filter of claim 1 wherein the first flexible side panel, the second flexible side panel or the flexible end cap comprises an inner layer of a thermoplastic material thermoplastically welded to the plurality of individual filter panels and an outer layer of a nonwoven material thermoplastically welded to the inner layer.
6. The V-bank filter of claim 5 wherein the thermoplastic material comprises polyethylene film.
7. The V-bank filter of claim 6 wherein the nonwoven material comprises polyester.
8. The V-bank filter of claim 5 wherein the nonwoven material comprises polyester.
9. The V-bank filter of claim 5 wherein the thermoplastic material comprises 5-30 mil polyethylene and the nonwoven material comprises 3-10 mil polyester.
10. The V-bank filter of claim 1 wherein the first flexible side panel, the second flexible side panel or the flexible end cap comprises a material having a bend radius of less than or equal to 2.0 inches.
11. The V-bank filter of claim 1 wherein the distance, C, in the collapsed position is less than or equal to 50% of the distance, O.
12. The V-bank filter of claim 1 wherein the first flexible side panel and the second flexible side panel extend past an upper surface of the plurality of filter panels forming a flexible flange.
13. The V-bank filter of claim 1 wherein a first end cap applied to a first outer filter panel and a second end cap applied to a second outer filter panel extend from each filter panel forming a flexible flange.
14. The V-bank filter of claim 13 wherein the flexible flanges are disposed into a groove in a frame and held within the groove by an elastomeric member.
15. The V-bank filter of claim 14 wherein the elastomeric member extends further than a depth of the groove thereby forming a sealing surface extending from the frame for sealing the V-bank filter to an air intake housing.
16. The V-bank filter of claim 14 wherein the elastomeric member has a circular cross section prior to installation in the groove and an hourglass cross section after installation in the groove.
17. The V-bank filter of claim 1 wherein the plurality of individual filter panels are parallel to each other in the collapsed position.
18. The V-bank filter of claim 1 comprising a restraining member holding the V-bank filter in the collapsed position and wherein after removal of the restraining member the V-bank filter at least partially springs open to the operating position.
19. The V-bank filter of claim 18, wherein the restraining member comprises a band securing the V-bank filter in the collapsed position.
20. A method of making the V-bank filter of claim 1 comprising:
    placing the plurality of individual filter panels in a fixture to hold them in the one or more V-shaped configurations;
    placing the first side panel into the fixture adjacent the first side edges of the plurality of individual filter panels, and placing the second side panel into the fixture adjacent the second side edges of the plurality of individual filter panels;

clamping the first side panel and the second side panel between opposing heated platens;

heating the first side panel and the second side panel to join them to the first and second side edges of the plurality of individual filter elements;

removing the opposing heated platens; and removing the V-bank filter from the fixture.

21. The V-bank filter of claim 1 wherein the first flexible side panel or the second flexible side panel comprise a structural weakening element.

22. The V-bank filter element of claim 21 wherein the structural weakening element is selected from the group consisting of slits, cutouts, apertures, perforations, score lines, fold lines, or pleats.

* * * * *